United States Patent [19]

Adachi

[11] Patent Number: 5,067,163

[45] Date of Patent: Nov. 19, 1991

[54] METHOD FOR DETERMINING A DESIRED IMAGE SIGNAL RANGE FROM AN IMAGE HAVING A SINGLE BACKGROUND

[75] Inventor: Yuuma Adachi, Kanagawa, Japan

[73] Assignee: Fuji Photo Film Co., Ltd., Kanagawa, Japan

[21] Appl. No.: 413,159

[22] Filed: Sep. 27, 1989

[30] Foreign Application Priority Data

Sep. 28, 1988 [JP] Japan .................................. 63-243436

[51] Int. Cl.⁵ .......................... G06K 9/38; H05B 33/00; G03G 5/16; G06F 15/00
[52] U.S. Cl. ............................................. 382/6; 382/50; 382/53; 382/51; 250/484.1; 250/327.2; 364/413.13
[58] Field of Search ................. 364/414.13; 250/484.1, 250/327.2; 382/50, 53, 6, 51

[56] References Cited

U.S. PATENT DOCUMENTS

| | | |
|---|---|---|
| 4,258,264 | 3/1981 | Kotera et al. |
| 4,276,473 | 6/1981 | Kato et al. ........................... 250/337 |
| 4,315,318 | 2/1982 | Kato et al. |
| 4,387,428 | 6/1983 | Ishida et al. |
| 4,638,162 | 11/1987 | Tanaka ........................... 364/413.13 |
| 4,682,028 | 7/1987 | Tanaka et al. ................... 250/327.2 |
| 4,905,149 | 2/1990 | Adachi ........................... 364/413.13 |

*Primary Examiner*—David K. Moore
*Assistant Examiner*—Michael Cammarata
*Attorney, Agent, or Firm*—Sughrue, Mion, Zinn, Macpeak & Seas

[57] ABSTRACT

An image signal representing a radiation image comprising an object image and a background region is converted with a predetermined threshold value into a two-valued system, from which a binary image comprising regions approximately corresponding to the object image and the background region is formed.

In cases where only one area makes up the region approximately corresponding to the background region in the binary image, a picture element, which corresponds to the image signal value closest to the threshold value among at least some of the picture elements constituting an edge of the binary image in the region approximately corresponding to the object image, is set as another area making up part of the region approximately corresponding to the background region. Thereby two areas separated by the region approximately corresponding to the object image are formed. Binary images are formed repeatedly with the threshold value being changed sequentially so that the two area forming the region approximately corresponding to the background region expand until they meet each other. The desired image signal range is determined from the image signal components corresponding to the picture elements located in the regions approximately corresponding to the background region, which is formed when the two areas become connected to each other.

3 Claims, 6 Drawing Sheets

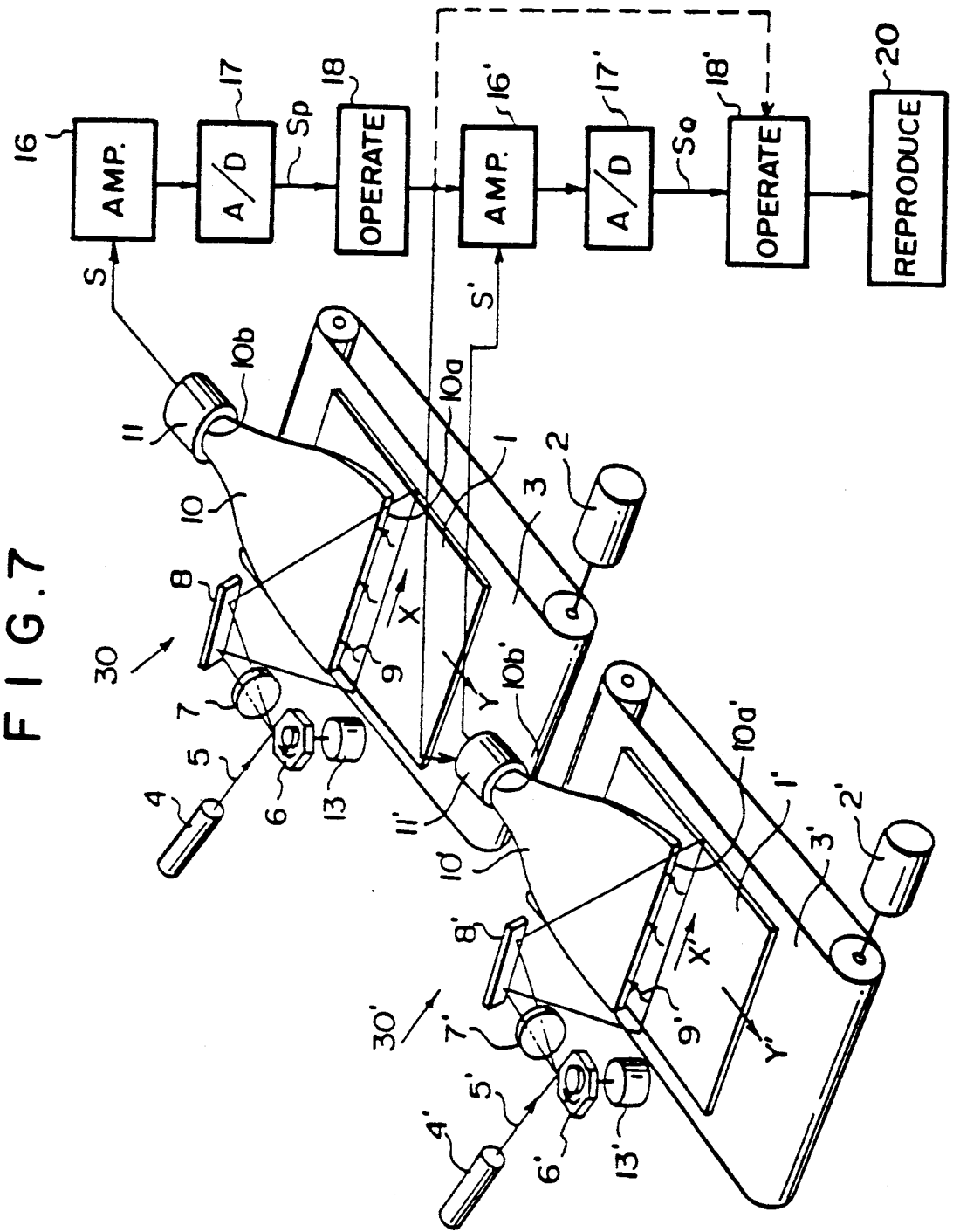

METHOD FOR DETERMINING A DESIRED IMAGE SIGNAL RANGE FROM AN IMAGE HAVING A SINGLE BACKGROUND

BACKGROUND OF THE INVENTION

1. Field of the Invention

This invention relates to a method for determining a desired image signal range in an image signal representing a radiation image, which image signal range represents information recorded within a desired image region to be viewed in the radiation image 2. Description of the Prior Art Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during its exposure to the radiation. A phosphor exhibiting such properties is referred to as a stimulable phosphor. As disclosed in Japanese Unexamined Patent Publication Nos 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light which the stimulable phosphor sheet emits upon stimulation varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain a desirable image density, an appropriate read-out gain is set when the emitted light is being detected with a photoelectric read-out means and converted into an electric signal to be used in the reproduction of a visible image on a recording material, such as photographic film, or on a display device, such as a CRT.

In order for an image signal to be detected accurately, certain factors which affect the image signal must be set in accordance with the dose of radiation delivered to the stimulable phosphor sheet and the like. A novel radiation image recording and reproducing system which accurately detects an image signal has been proposed. The proposed radiation image recording and reproducing system is constituted such that a preliminary read-out operation (hereinafter simply referred to as the "preliminary readout") is carried out in order approximately to ascertain the radiation image stored on the stimulable phosphor sheet In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having a high energy level, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor, which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (including the preliminary readout image signal) obtained and to adjust the image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

When the radiation image, which has been recorded on a recording medium, is reproduced as a visible image on a photographic material or the like, only certain portions of the total radiation image will be used. In order for the read-out conditions for the final readout and/or the image processing conditions to be set correctly, it is necessary to consider which portions of the radiation image are to be used and therefore are required to have an appropriate image density in the reproduced image.

FIG. 10 is a schematic view showing an example of the radiation image of the cervical region of a human body.

By way of example, for radiation images of the cervical region, only the image information concerning the cervical vertebra image A and the surrounding soft tissues is usually necessary (for a diagnosis of an illness to be made). The image information from other parts of the radiation image, i.e. a background region B upon which radiation impinged directly during the recording of the radiation image on the recording medium, a jaw image C, and a shoulder image D, is not necessary. (The amount of radiation to which the recording medium was exposed is largest in the background region B. Also, herein, the level of the image signal will increase as the amount of radiation to which the recording medium is exposed becomes larger ) In such cases, it is desired that the read-out conditions for the final readout and/or the image processing conditions be set such that the cervical vertebra image A and the image of the surrounding soft tissues are reproduced with an appropriate image density.

In order to satisfy such a requirement, the applicant has proposed a novel method in, for example, Japanese Unexamined Patent Publication No. 60(1985)-156055.

The proposed method comprises the steps of: determining the histogram of the preliminary read-out image signal obtained during the preliminary readout, calculating the maximum image signal level Smax and the minimum image signal level Smin of the desired image signal range from the histogram, and adjusting the read-out conditions for the final readout so that the maximum image signal level Smax and the minimum image signal level Smin correspond respectively to the maximum signal level Qmax and the minimum signal level Qmin which are determined by the maximum density Dmax and the minimum density Dmin of the correct density range in the reproduced visible image. The proposed method is applicable also when the image processing conditions are adjusted in a system wherein no preliminary readout is carried out, or the like.

In the course of carrying out the proposed method, it is necessary to calculate Smax and Smin accurately. However, for example, for images of the cervical region, the levels of the image signal components representing the jaw image C and the shoulder image D are lower than the levels of the image signal components representing the desired image region, i.e. the cervical vertebra image A and the image of the surrounding soft tissues. In such cases, Smax and Smin cannot be found sufficiently accurately with the method disclosed in Japanese Unexamined Patent Publication No. 60(1985)-156055 wherein Smax and Smin are calculated using a frequency threshold value which has been determined from the histogram of the image signal representing the whole radiation image with reference to what portion of an object is recorded and the image recording method used.

FIG. 11 is a graph showing the probability density function of the image signal representing the whole radiation image of the cervical region shown in FIG. 10.

By way of example, if the probability density function of the image signal representing the desired image region is composed of a section I corresponding to the jaw image and the shoulder image, a section II corresponding to the cervical vertebra image, and a section III corresponding to the image of soft tissues such as a skin and the probability density function of the image signal representing the desired image region extends approximately over the probability density function of the whole image signal except for a section IV which corresponds to the background region and which can be distinctly discriminated from the other sections because of its shape, then no section corresponding to an undesired image region is present on the side of the probability density function corresponding to the lower values of the image signal (the lower values of the image density). In such cases, Smax and Smin of the desired image signal range representing the desired image region can be calculated approximately accurately with a frequency threshold value which is determined from the shape of the probability density function of the image signal representing the whole radiation image. However, in cases where the part of the probability density function corresponding to the desired image region is composed only of a section such as section II and a section such as section III, and the section I corresponding to the jaw image and the shoulder image falls in the undesired image region and is adjacent to the sections corresponding to the desired image region at the lower image signal value end of the density function, it is not always possible for Smax and Smin of the desired image signal range representing the desired image region to be calculated accurately with the method wherein Smax and Smin are calculated from the probability density function of the whole image signal using merely a predetermined frequency threshold value.

One of methods for solving the aforesaid problems has been proposed by the applicant in Japanese Patent Application No. 62(1987)-207212. The proposed method is premised on the assumption that a radiation image recorded on a recording medium is composed of an object image, and two background regions which are separated by the object image. With the proposed method, an image signal representing the radiation image is converted with a predetermined threshold value into a two-valued system in order to form a binary image which comprises a region approximately corresponding to the object image and two areas approximately corresponding to the background region. Thereafter, the threshold value is sequentially made smaller, and the formation of the binary image is repeated until the two areas approximately corresponding to the background region become connected. A desired image signal range is determined from the image signal components which correspond to the picture elements associated with the two areas which form the background region and have become connected.

The aforesaid method is premised on the assumption that the background region in the radiation image is formed from two areas which are separated by the object image as shown in FIG. 10. Many radiation images of, for example, the cervical region have two areas forming the background region as shown in FIG. 10. However, some of the radiation images of the cervical region have only a single area forming the background region as shown in FIG. 1. In such cases, the aforesaid method cannot be applied. Therefore, there is the risk that the read-out conditions for the final readout and/or the image processing conditions will not be adjusted appropriately and that the reproduced visible image will have poor image quality and be unsuitable for, in particular, diagnostic purposes.

OBJECT OF THE INVENTION

In view of the aforesaid circumstances, the object of the present invention is to provide a method for finding the image signal range which corresponds to a desired image region in a radiation image even when a region of the radiation image is present which wa exposed to a smaller amount of radiation than the desired image region and even when only a single area makes up the background region in the radiation image.

SUMMARY OF THE INVENTION

The present invention provides a method for finding a desired image signal range, which comprises the steps of:

i) converting an image signal, which is made up of a plurality of image signal components whose values represent picture elements of a radiation image comprising an object image and a background region, into a two-valued system using a predetermined threshold value in order to form a binary image which comprises a region approximately corresponding to the object image and a region approximately corresponding to the background region, ii) in cases where only a single area makes up the background region in said binary image, setting the picture element corresponding to the image signal component having the value closest to said predetermined threshold value among the image signal components corresponding to all or some of the picture elements, which are located in said region approximately corresponding to the object image and which constitute an edge of said binary image, as another area making up the region approximately corresponding to the background region, thereby forming the background region out of two areas which are separated by said region approximately corresponding to the object image, iii) repeating the formation of the binary image with the threshold value being changed sequentially so that two said areas which form said region approximately corresponding to the background region expand until they become connected to each other, and iv) finding the desired image signal range from the values of the image signal components corresponding to the picture elements located in said areas which form said region approximately corresponding to the background region and which have become connected to each other.

The term "image signal" as used herein embraces a preliminary read-out image signal which is obtained during a preliminary readout in systems wherein a preliminary readout is carried out. Also, the image signal may be proportional or inversely proportional to the amount of radiation to which the recording medium was exposed. Alternatively, the image signal may be proportional to the logarithmic value of the amount of radiation to which the recording medium was exposed, or the like.

With the method for determining a desired image signal range in accordance with the present invention, in cases where only a single area forms the background region in the binary image, another area which can be regarded as being part of the background region is defined at a position separate from the aforesaid background region. In this manner, the method for finding the desired image signal range in accordance with the present invention eliminates the drawback of the method proposed in Japanese Patent Application No. 62(1987)-207212 in which the desired image signal range can be determined accurately only when two areas form the background region and are separated by an object image. A false background area should be defined at a specific position in the region approximately corresponding to the object image in the binary image and at a picture element corresponding to a specific image signal level. Specifically, studies and experiments carried out by the inventors revealed that it is efficient to use the position of the picture element corresponding to the image signal component having the value closest to the predetermined threshold value among the image signal components corresponding to all or some of the picture elements, which are located in the region approximately corresponding to the object image in the binary image and constitute an edge of the binary image, as another area forming the region approximately corresponding to the background region.

With the method for determining a desired image signal range in accordance with the present invention, a false area is defined in the manner described above, and it forms part of the region corresponding to the background region. Thereby, two areas form the region approximately corresponding to the background region, and they are separated by the region approximately corresponding to the object image. The formation of the binary image is repeated with the threshold value being changed sequentially so that the two areas forming the region approximately corresponding to the background region expand until they become connected to each other. The desired image signal range is determined from the values of the image signal components corresponding to the picture elements located in the areas forming the region approximately corresponding to the background region after those areas have become connected to each other. Therefore, the image signal range representing the desired image region in a radiation image can be found even when a region of the radiation image is present which was exposed to a smaller amount of radiation than the desired image region and even when only a single area makes up the background region in the radiation image.

BRIEF DESCRIPTION OF THE DRAWINGS

FIG. 7 is a schematic view showing an example of a radiation image read-out and reproducing system wherein an embodiment of the method for determining the desired image signal range in accordance with the present invention is employed.

DESCRIPTION OF THE PREFERRED EMBODIMENTS

Figure 1:
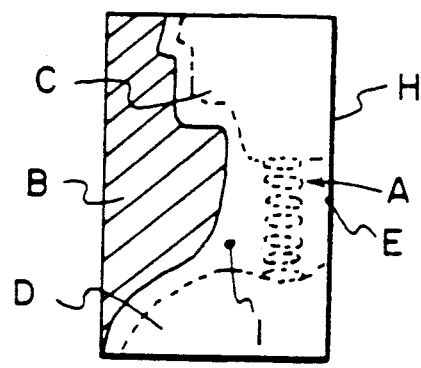
FIG. 1 is a schematic view showing an example of a radiation image of the cervical region of a human body.

The present invention will hereinbelow be described in further detail with reference to the accompanying drawings.

FIG. 7 is a schematic view showing an example of a radiation image read-out and reproducing system wherein an embodiment of the method for determining a desired image signal range in accordance with the present invention is employed. In this embodiment, a radiation image of the cervical region of a human body is stored on a stimulable phosphor sheet and a preliminary readout is carried out.

A stimulable phosphor sheet 1 on which a radiation image has been stored is placed at a predetermined position in a preliminary read-out section 30 which carries out a preliminary readout by scanning the stimulable phosphor sheet 1 with a light beam having a low energy level, thereby releasing only part of the energy from the stimulable phosphor sheet 1, which energy was stored during its exposure to radiation. The stimulable phosphor sheet 1 is conveyed in a sub-scanning direction indicated by the arrow Y by a sheet conveyance means 3, which is constituted of an endless belt or the like and which is operated by a motor 2. A laser beam 5 which has a low energy level is produced by a laser beam source 4 is reflected and deflected by a rotating polygon mirror 6 which is quickly rotated by a motor 13 in the direction indicated by the arrow. The laser beam 5 then passes through a converging lens 7 constituted of an fθ lens or the like. The direction of the optical path of the laser beam 5 is then changed by a mirror 8, and the laser beam 5 impinges upon the stimulable phosphor sheet 1 and scans it in a main scanning direction indicated by the arrow X, which direction is approximately normal to the sub-scanning direction indicated by the arrow Y. When the stimulable phosphor sheet 1 is exposed to the stimulating rays 5, the exposed portion of the stimulable phosphor sheet 1 emits light 9 in an amount proportional to the amount of energy stored thereon during its exposure to radiation. The emitted light 9 is guided by a light guide member 10 and photoelectrically detected by a photomultiplier 11. The light guide member 10 is made from a light guiding material such as an acrylic plate and has a linear light input face 10a, positioned so that it extends along the main scanning line on the stimulable phosphor sheet 1, and a ring-shaped light output face 10b, positioned so that it is in close contact with a light receiving face of the photomultiplier 11. The emitted light 9, which has entered the light guide member 10 at its light input face 10a, is guided through repeated total reflection inside of the light guide member 10, emanates from the light output face 10b, and is received by the photomultiplier 11. In this manner, the amount of the emitted light 9, which amount represents the radiation image, is converted into an electric signal by the photomultiplier 11.

An analog output signal S generated by the photomultiplier 11 is logarithmically amplified by a logarithmic amplifier 16, and digitized by an A/D converter 17 into a preliminary read-out image signal SP. The level of the preliminary read-out image signal SP is proportional to the logarithmic value of the intensity of the light emitted by each position on the stimulable phosphor sheet 1.

In the preliminary readout, read-out conditions, such as the voltage applied to the photomultiplier 11 or the amplification factor of the logarithmic amplifier 16, are adjusted so that image information can be detected accurately even if the amount of energy stored on the stimulable phosphor sheet 1 during its exposure to radiation varies over a wide range.

The preliminary read-out image signal SP obtained in the manner described above is fed into an operating section 18. The operating section 18 determines the desired image signal range and calculates the read-out conditions for the final readout, which will be described later, on the basis of the preliminary read-out image signal SP.

Figure 10:
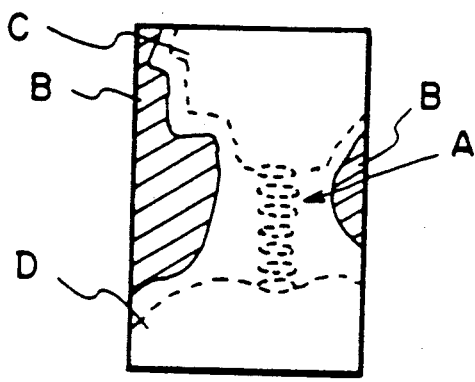
FIG. 10 is a schematic view showing an example of a radiation image of the cervical region of a human body.
Figure 11:
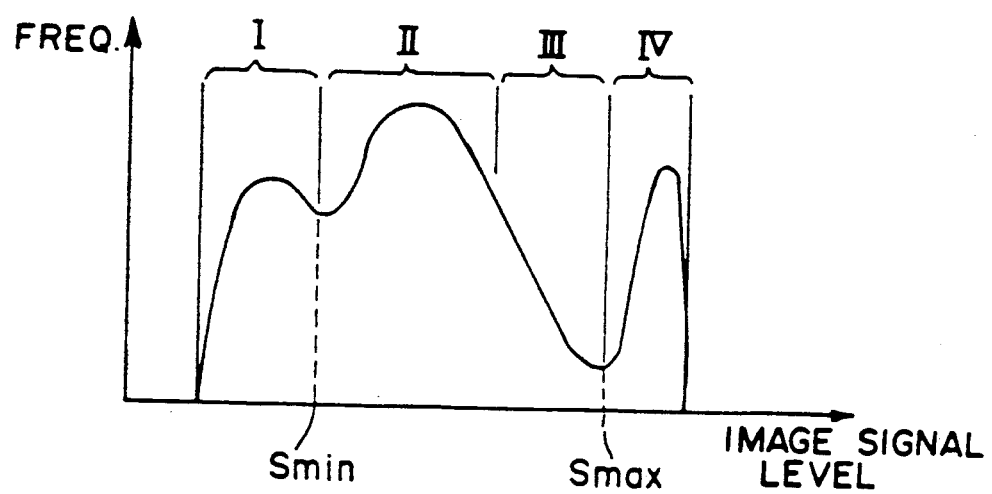
FIG. 11 is a graph showing the probability density function of an image signal which represents the whole radiation image of the cervical region shown in FIG. 10.

FIG. 1 is a schematic view showing an example of the radiation image of the cervical region of a human body, which image is represented by a preliminary read-out image signal SP. The preliminary read-out image signal SP is obtained in the manner described above. As in FIG. 10, the reference characters A, B, C and D respectively denote a cervical vertebra image, a background region, a cervical image, and a shoulder image. The term "object image" refers to all regions other than the background region B. Reference character E denotes the picture element which corresponds to the maximum signal level among those picture elements constituting a side H. Side H is one of the four sides constituting the edges of the (rectangular) radiation image, and the background region B is not present anywhere along side H.

Figure 2:
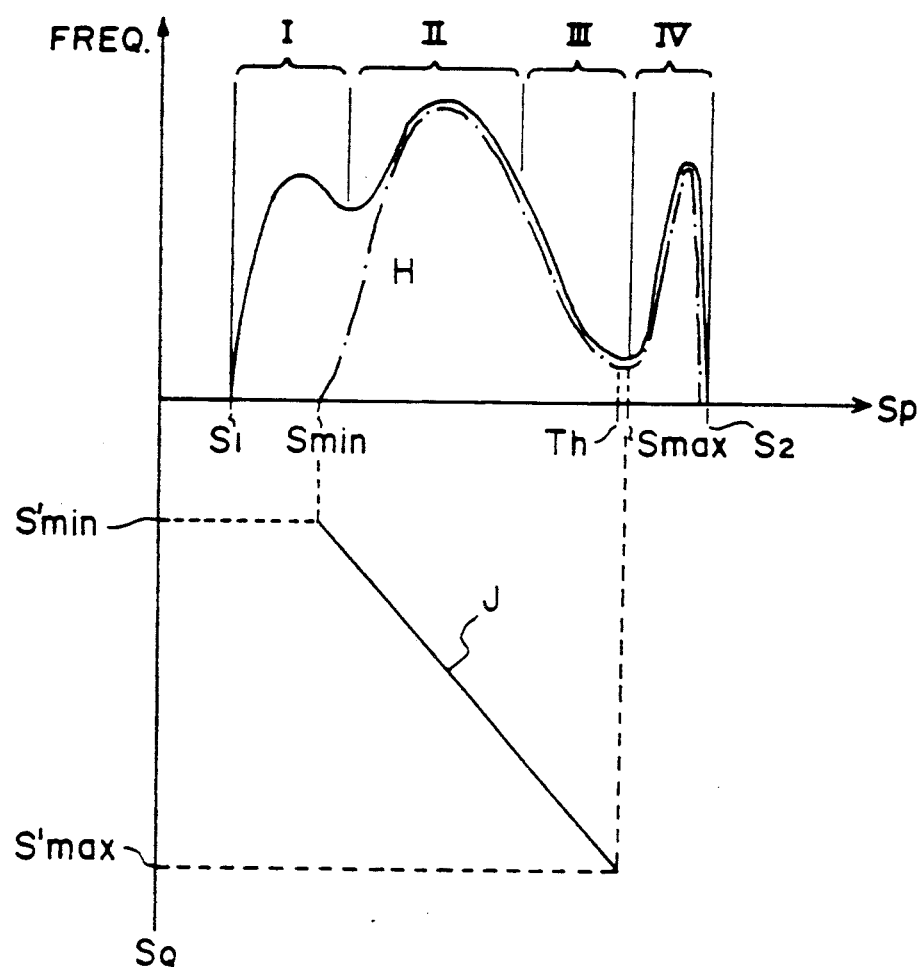
FIG. 2 is a graph showing the probability density function of a preliminary read-out image signal which represents the radiation image shown in FIG. 1, FIGS. 3A, 3B and 3C are schematic views showing binary images corresponding to the radiation image shown in FIG. 2.

FIG. 2 is a graph showing the probability density function of the preliminary read-out image signal SP, which represents the radiation image shown in FIG. 1.

The jaw image C and the shoulder image D shown in FIG. 1 correspond to a section I, in which the signal level of the preliminary read-out image signal SP is low. The cervical vertebra image A corresponds to a section II, and the image of soft tissues such as skin corresponds to a section III. Also, the background region B corresponds to a section IV, in which the signal level is highest.

Figure 3A:
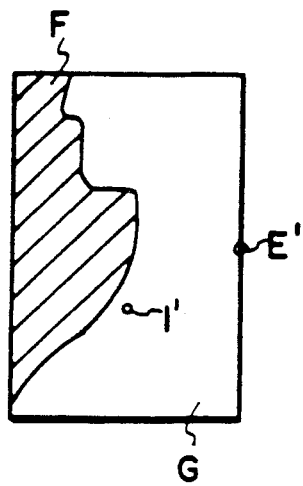
Figure 3B:
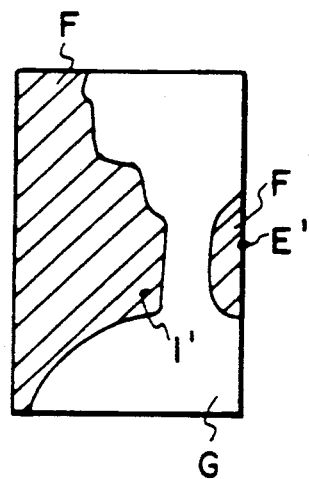
Figure 3C:
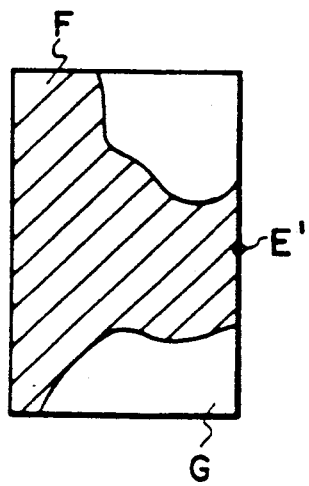

FIGS. 3A, 3B and 3C are schematic views showing binary images which are obtained from the conversion of the preliminary read-out image signal SP corresponding to the radiation image shown in FIG. 2 into a two-valued system. Each of the binary images is constituted of a region F approximately corresponding to the background region and a region G approximately corresponding to the object image. In FIGS. 3A, 3B and 3C, the reference character E' denotes a picture element of the binary image which is located at the position corresponding to the picture element E shown in FIG. 2.

The binary image shown in FIG. 3A is obtained from an operation wherein the preliminary read-out image signal SP is converted into a two-valued system using a threshold value Th (shown in FIG. 2) which has a medium level between the signal level corresponding to the background region B of the radiation image shown in FIG. 2 and the signal level corresponding to the object image. The region approximately corresponding to the background region is made up of a single area in the binary image. Therefore, the picture element E', i.e. the picture element of the binary image which corresponds to the picture element E of the radiation image shown in FIG. 2, is regarded as a false area making up part of the background region.

The binary image shown in FIG. 3B is obtained from an operation wherein the preliminary read-out image signal SP is converted into a two-valued system using a threshold value which is lower than the signal level corresponding to the picture element E shown in FIG. 2; i.e. it is approximately equal to the level corresponding to the boundary between section II (cervical vertebra image A) and section III (the image of soft tissues). When the threshold value is lowered to such a level, an area approximately corresponding to the area covered by the image of soft tissues is included as part of the region F approximately corresponding to the background region. As shown in FIG. 3B, the background region F expands to include the region around the picture element E'.

If a picture element I shown in FIG. 1 (corresponding to the picture element I' shown in FIGS. 3A and 3B) is defined as a false area making up part of the region approximately corresponding to the background region, the problem described below will arise. Specifically, when the threshold value is sequentially lowered from the level of the predetermined threshold value Th (shown in FIG. 2), with which the binary image shown in FIG. 3A was obtained, to the level with which the binary image shown in FIG. 3B is obtained (i.e. the level approximately corresponding to the boundary between the sections II and III shown in FIG. 1), the true background region F and the false area (at picture element I') become connected to each other in the resulting binary image. The preliminary read-out image signal SP corresponding to the region F approximately corresponding to the background region, which region F is formed at this stage (FIG. 3), does not include information about the cervical vertebra image A (the section II) which is the most important to a diagnosis. Therefore, the desired image signal range cannot be extracted, and the read-out conditions for the final read-out which will be described below cannot be set to appropriate values.

In the present invention, as shown in FIG. 3A, the picture element E' is set as a false area making up part of the region approximately corresponding to the background region. Therefore, the two areas forming the region approximately corresponding to the background region do not become connected to each other at the stage of FIG. 3B.

The binary image shown in FIG. 3C is formed with the threshold value being lowered until the two areas forming the region approximately corresponding to the background region become connected to each other. In this binary image, the cervical vertebra image A (the section II) becomes part of the region F approximately corresponding to the background region, and the jaw image C and the shoulder image D (section I) corresponding to signal levels lower than the signal levels of the cervical vertebra image A remain in the region G approximately corresponding to the object image. Specifically, when the two areas forming the region F approximately corresponding to the background region have become connected to each other, the background region B shown in FIG. 1, as well as the cervical vertebra image and the image of soft tissues, which images fall within the desired image region, are completely included in the region F approximately corresponding to the background region. The jaw image and the shoulder image, which fall within the undesired image region, are substantially excluded from the region F approximately corresponding to the background region.

After the two areas forming the region approximately corresponding to the background region have become connected to each other, the image signal components of the preliminary read-out image signal corresponding to the picture elements located in the region approximately corresponding to the background region are extracted. Thereafter, the probability density function of only the extracted image signal components of the preliminary read-out image signal is created, and Smax and Smin of the desired image signal range are calculated on the basis of this probability density function.

The probability density function has the shape indicated by the chained line H in FIG. 2. The probability density function does not include the image signal components of the preliminary read-out image signal, which fall within the undesired image region and correspond to the jaw image and the shoulder image, but does include the image signal components of the preliminary read-out image signal, which fall within the desired image region and correspond to the cervical vertebra image and the image of soft tissues. Therefore, the minimum image signal level in the probability density function approximately coincides with the minimum image signal level of the cervical vertebra image. Accordingly, from the probability density function of the signal corresponding to the region approximately corresponding to the background region, the desired image signal range can be calculated. The desired image signal range includes the image signal components representing the cervical vertebra image and the image of soft tissues, which fall in the desired image region. With the conventional method, Smin of the desired image signal range is calculated from the probability density function of the whole image signal, and it is not always possible to calculate Smin accurately.

No limitation is imposed on how Smin and Smax are calculated on the basis of the probability density function. For example, the minimum image signal level of the probability density function H may be employed as Smin. The part of the probability function corresponding to the background region has a distinct shape. Therefore, based on the shape of the probability density function, the signal level at the boundary between the background region and the other regions may be calculated in the same manner as in the conventional method and employed as Smax.

The desired image signal range, i.e. the range of Smin to Smax, is determined from the preliminary readout image signal SP in the manner described above. Thereafter, as shown in FIG. 2, the read-out conditions for the final readout are set so that during the final readout (which will be described later) Smin and Smax of the preliminary read-out image signal are detected respectively as the minimum value S'min and the maximum value S'max of a final read-out image signal SQ. Specifically, the read-out conditions for the final readout are set so that the components of the preliminary read-out image signal falling within the range of Smin to Smax would have been detected as lying on the straight line J shown in FIG. 2.

Another embodiment of the method for determining a desired image signal range in accordance with the present invention, which is applied to a radiation image of the abdomen, will be described hereinbelow.

Figure 4:
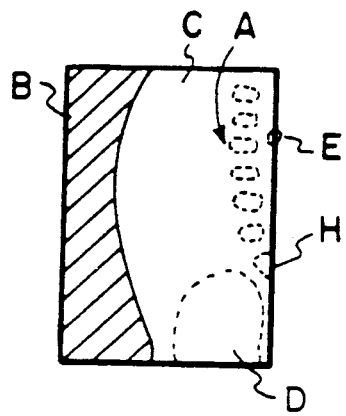
FIG. 4 is a schematic view showing an example of a radiation image of the abdomen of a human body.

FIG. 4 is a schematic view showing an example of a radiation image of the abdomen. In FIG. 4, reference characters A, B, C and D respectively denote a thoracic and lumbar vertebra image, a background region, an image of soft tissues such as the internal organs, and a pelvis image. The background region B in the radiation image is made up of only a single area.

Figure 5:
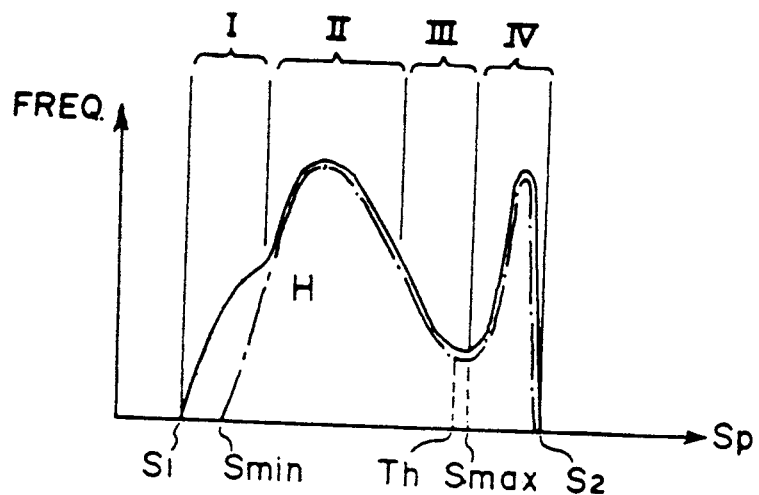
FIG. 5 is a graph showing the probability density function of the whole preliminary read-out image signal which represents the radiation image shown in FIG. 4, FIGS. 6A, 6B and 6C are schematic views showing binary images corresponding to the radiation image shown in FIG. 4.

FIG. 5 is a graph showing the probability density function of the whole preliminary read-out image signal which represents the radiation image shown in FIG. 4. In FIG. 5, reference numerals I, II, III and IV respectively denote a section corresponding to the pelvis image, a section corresponding to the thoracic and lumbar vertebra image, a section corresponding to the image of soft tissues such as the internal organs, and a section corresponding to the background region.

In the probability density function shown in FIG. 5, section II, which corresponds to the thoracic and lumbar vertebra image, and section III, which corresponds to the image of soft tissues such as the internal organs, make up the desired image region. Section I, which corresponds to the pelvis image and falls within the undesired image region, is present adjacent to sections II and III on the lower signal level side of the probability density function.

In this embodiment, a preliminary read-out image signal SP representing the abdomen image is detected in the same manner as in the aforesaid embodiment. The preliminary read-out image signal SP is then converted into a two-valued system using a predetermined threshold value (Th) in order to generate a binary image comprising a region G approximately corresponding to the object image and a region F approximately corresponding to the background region.

Figure 6A:
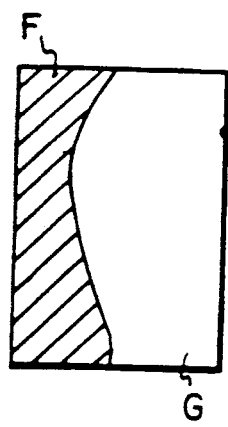
Figure 6B:
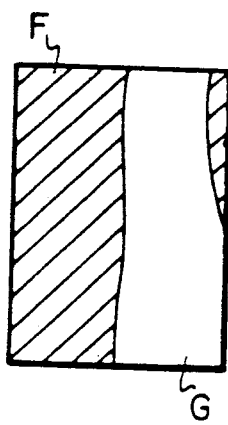
Figure 6C:
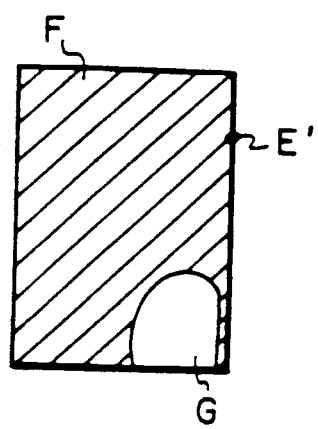

FIGS. 6A, 6B and 6C show binary images. The binary image shown in FIG. 6A is obtained using a threshold value which is equal to the signal level Th shown in FIG. 5. Only a single area makes up region F approximately corresponding to the background region in this binary image. Therefore, the picture element E corresponding to the maximum signal level is detected from among those picture elements which constitute a side H of the radiation image shown in FIG. 1, and the picture element E' of the binary image, which corresponds to the picture element E, is set as a false area making up part of the region approximately corresponding to the background region.

The binary image shown in FIG. 6B is obtained using a threshold value smaller than the threshold value Th used to form the binary image shown in FIG. 6A. In FIG. 6B, the region F approximately corresponding to the background region is broader than in FIG. 6A. Also, the background region has expanded around the picture element E'.

The binary image shown in FIG. 6C is formed with the threshold value lowered even further. It is lowered until the two areas forming the region approximately corresponding to the background region shown in FIG. 6 become connected to each other.

When the threshold value is lowered sequentially until the two areas forming the region approximately corresponding to the background region become connected to each other as shown in FIG. 6C, the background region B in the radiation image shown in FIG. 4, as well as the thoracic and lumbar vertebra image and the image of soft tissues, which images fall within the desired image region, are completely included in the region F approximately corresponding to the background region. The pelvis image, which falls within the undesired image region, is substantially excluded from the region F approximately corresponding to the background region.

After the two areas forming the region approximately corresponding to the background region have become connected to each other, the image signal components of the preliminary read-out image signal corresponding to the picture elements located in the region approximately corresponding to the background region are extracted. Thereafter, the probability density function of only the extracted image signal components of the preliminary read-out image signal (which probability density function is indicated by the chained line in FIG. 5) is created, and Smax and Smin of the desired image signal range are calculated from this probability density function.

The calculation of Smax and Smin from the probability density function of the extracted image signal components may be carried out in the same manner as that for the jaw image described above.

In the aforesaid embodiments, Smax and Smin need not necessarily be calculated from the probability density function of the image signal components of the preliminary read-out image signal corresponding to the picture elements located in the region approximately corresponding to the background region. For example, Smin and Smax may be found from the minimum level and the maximum level of the preliminary read-out image signal corresponding to the region approximately corresponding to the background region, which is formed when the two background areas become connected. In such cases, by way of example, the minimum level and the maximum level of the preliminary read-out image signal corresponding to the region approximately corresponding to the background region, which is formed when the two background areas become connected, may be directly employed as Smin or Smax. Alternatively, a predetermined value may be added to or subtracted from the minimum level and the maximum level of the preliminary read-out image signal corresponding to the region approximately corresponding to the background region, or the minimum level and the maximum level may be multiplied by a certain coefficient. The values thus calculated may be regarded as Smin and Smax.

After determining the desired image signal range in the manner described above, the operating section 18 sets the read-out conditions for the final readout, such as the voltage to be applied to a photomultiplier 11' shown in FIG. 7 or the amplification factor to be set in a logarithmic amplifier 16', in accordance with the desired image signal range.

A stimulable phosphor sheet 1' on which the preliminary readout has been finished is placed at a predetermined position in the final read-out section 30' shown in FIG. 7 and scanned with a laser beam 5' having an energy level higher than that of the laser beam 5 used during the preliminary readout. In this manner, an image signal is detected under read-out conditions which have been set as described above. The configuration of the final read-out section 30' is nearly the same as that of the preliminary read-out section 30, and therefore elements corresponding to those constituting the preliminary read-out section 30 are numbered with corresponding primed reference numerals in FIG. 7.

After the image signal SQ is digitized in an A/D converter 17', the image signal SQ is fed into an operating section 18', which carries out appropriate image processing on the image signal SQ. After being image processed, the image signal is fed into a reproducing apparatus 20, which reproduces a visible image by use of the image signal.

In the aforesaid embodiments, the preliminary read-out section 30 and the final read-out section 30' are separate from each other. Alternatively, because the configurations of the preliminary read-out section 30 and the final read-out section 30' are approximately identical to each other, a single read-out means may be utilized for performing both the preliminary readout and the final readout. In this case, after being subjected to the preliminary readout wherein a weak light beam is used for the scanning, the stimulable phosphor sheet 11 may be moved back to the position at which image readout is started. Thereafter, the final readout may be carried out with a strong light beam being used for the scanning.

In cases where a single read-out means is utilized to perform both the preliminary readout and th final read-out, it is necessary to change the intensity of the light beam used in the preliminary readout and the final read-out. For this purpose, various methods may be employed; for example, a laser beam source or the like may change the intensity of the light beam, or the intensity of the light beam may be changed with an ND filter or the like being moved into and out of the optical path of the light beam. Alternatively, the diameter of the light beam may be changed, or the speed at which the stimulable phosphor sheet is scanned with the light beam in the main scanning direction or in the sub-scanning direction may be changed.

In the aforesaid embodiments, the read-out conditions for the final readout are set on the basis of the desired image signal range which is determined by the operating section 18. Alternatively, predetermined read-out conditions may be used when the final readout is carried out regardless of the desired image signal range. The desired image signal range determined by the operating section 18 may then be fed into the operating section 18' as indicated by the broken line in FIG. 7 so that the image processing conditions, which are to be used when the image signal SQ obtained during the final readout is processed in the operating section 18', can be set properly. Alternatively, both the read-out conditions and the image processing conditions may be set on the basis of the desired image signal range.

The aforesaid embodiments are applied to radiation image read-out and reproducing systems wherein a preliminary readout is carried out. However, the method for determining the desired image signal range in accordance with the present invention is also applicable to radiation image read-out and reproducing systems wherein no preliminary read-out operation is carried out but wherein only a read-out operation corresponding to the final read-out operation in the aforesaid radiation image read-out and reproducing system is carried out. In these cases, an image signal is obtained by use of predetermined read-out conditions without the desired image signal range being taken into consideration. The desired image signal range is calculated from the image signal in the manner described above. The desired image signal range is then taken into consideration when the image signal is processed.

The method for determining the desired image signal range in accordance with the present invention is not limited to the aforesaid embodiments wherein a stimulable phosphor sheet is used, and is also applicable to, for example, systems wherein conventional X-ray film is used.

Figure 8:
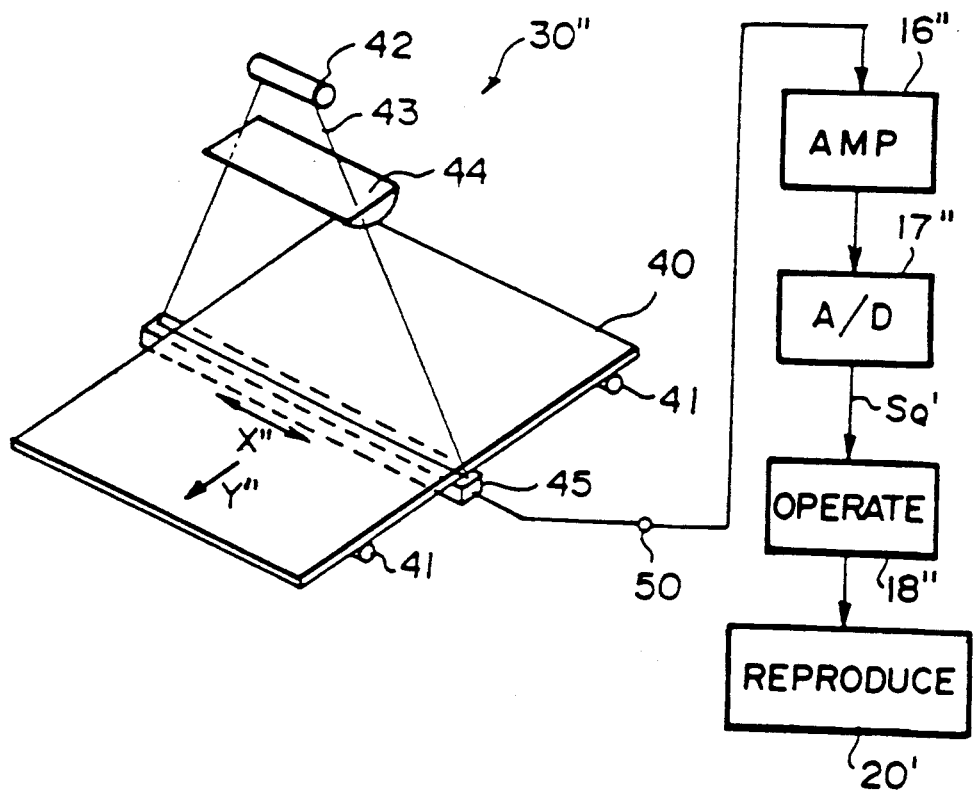
FIG. 8 is a schematic view showing an example of an X-ray image read-out and reproducing system wherein an X-ray image recorded on an X-ray film is read out and a visible X-ray image is reproduced therefrom.

FIG. 8 is a schematic view showing an example of an X-ray image read-out and reproducing system wherein an X-ray image recorded on an X-ray film is read out and reproduced as a visible image.

With reference to FIG. 8, a sheet of X-ray film 40, on which an X-ray image has been recorded, is placed at a predetermined position in a read-out section 30" and is conveyed in the direction indicated by the arrow Y''' by a film conveyance means 41.

Reading light 43 which is produced by an elongated light source 42 extending in one direction, is converged by a cylindrical lens 44 and is linearly irradiated onto the X-ray film 40 along the directions indicated by the double-headed arrow X''', which are approximately normal to the direction indicated by the arrow Y'''. A MOS sensor 45 is positioned below the X-ray film 40 so that the MOS sensor 45 can receive the reading light 43 which has passed through the X-ray film 40, the intensity of which light has been modulated in accordance with the X-ray image recorded on the X-ray film 40. The MOS sensor 45 comprises a plurality of solid state photoelectric conversion devices which are arrayed linearly at intervals equal to the intervals between the picture elements of the X-ray image along the directions indicated by the double-headed arrow X'''. As long as the X-ray film 40 is conveyed in the direction indicated by the arrow Y''' while being exposed to the reading light 43, the MOS sensor 45 detects the reading light, which has passed through the X-ray film 40, at predetermined intervals corresponding to the intervals between the picture elements of the X-ray image along the direction indicated by the arrow Y'''.

Figure 9:
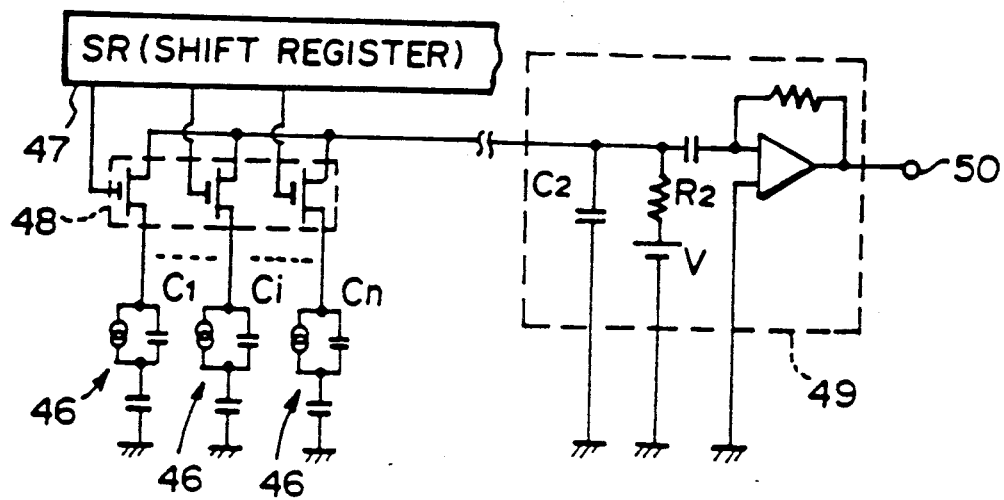
FIG. 9 is a circuit diagram showing an equivalent circuit for a MOS sensor.

FIG. 9 is a circuit diagram showing an equivalent circuit for the MOS sensor 45.

With reference to FIG. 9, photocarriers generated when the reading light 43 impinges upon the solid state photoelectric conversion devices 46, 46, ... accumulate in capacitors Ci (i=1, 2, ..., n) of the solid state photoelectric conversion devices 46, 46, ... The switches of a switch section 48 are turned on and off sequentially, which allows the number of photocarriers which has accumulated in the capacitors Ci to be detected. A shift register 47 controls the switches of the switch section 48, and a time-serial image signal is obtained. The image signal is then amplified by a pre-amplifier 49 and is output at an output terminal 50 of the pre-amplifier 49.

The analog image signal output by the MOS sensor 45 is fed into an operating section 18″ via a logarithmic amplifier 16″ and an A/D converter 17″. On the basis of the received image signal SQ', the operating section 18″ sets the image processing conditions in the same manner as in the aforesaid embodiments. Thereafter, based on the image processing conditions, appropriate image processing is carried out on the image signal SQ'. After it is processed, the image signal is fed into a reproducing apparatus 20', which reproduces a visible radiation image from the image signal. In the embodiment shown in FIG. 8, the MOS sensor 45 may be replaced by a charge coupled device (CCD) or a charge priming device (CPD). Also, in order to read out the X-ray image from the X-ray film 40, the X-ray film 40 may be two-dimensionally scanned with a light beam in the same manner as that described above for image readout from a stimulable phosphor sheet. Furthermore, instead of light which has passed through the X-ray film 40 being detected, light reflected by the X-ray film 40 may be detected.

The method for determining the desired image signal range in accordance with the present invention is applicable broadly when the desired image signal range is determined from an image signal representing a radiation image which comprises an object image and a background region comprised of only a single area.

I claim:

1. A method for finding a desired image signal range of an image signal representative of an image having an object image portion and a single background region, which comprises the steps of:

i) converting said image signal, which is made up of a plurality of image signal components whose values represent picture elements of said image, into a two-valued system using a predetermined threshold value in order to form a binary image which comprises a region approximately corresponding to the object image and a region approximately corresponding to the background region, creating a second area defining a region approximately corresponding to the background region by reassigning the picture element corresponding to the image signal component having the value closest to said predetermined threshold value from the image signal components corresponding to all or some of the picture elements, which are located in said region approximately corresponding to the object image and which constitute and edge of said binary image, to said second area defining the region approximately corresponding to the background region, thereby forming the background region out of two areas which are separated by said region approximately corresponding to the object image, iii) repeating the formation of the binary image with the said predetermined threshold value being changed sequentially so that said two areas which form said region approximately corresponding to the background region expand until they become connected to each other, and iv) finding the desired image signal range from the values of the image signal components corresponding to the picture elements located in said two areas which have become connected to each other through the performance of step (iii) herein.

2. A method as defined in claim 1 wherein said image signal is obtained during a preliminary read-out operation.

3. A method as defined in claim 1 wherein said image signal is obtained during a final read-out operation.

* * * * *